United States Patent
Dupre et al.

(10) Patent No.: US 11,831,798 B2
(45) Date of Patent: Nov. 28, 2023

(54) METHOD FOR TRANSMITTING AN ELECTRONIC ALARM VIA A SMARTPHONE, AND DEVICE FOR IMPLEMENTING THE METHOD

(71) Applicant: Jean-Luc Dupre, Antibes Juan les Pins (FR)

(72) Inventors: Jean-Luc Dupre, Antibes Juan les Pins (FR); Elkana Vinet Dimbiniaina, Toamasina (MG)

(73) Assignee: Jean-Luc Dupre, Juan les Pins Antibes (FR)

( * ) Notice: Subject to any disclaimer, the term of this patent is extended or adjusted under 35 U.S.C. 154(b) by 246 days.

(21) Appl. No.: 17/270,869

(22) PCT Filed: Aug. 31, 2019

(86) PCT No.: PCT/EP2019/073289
§ 371 (c)(1),
(2) Date: Feb. 24, 2021

(87) PCT Pub. No.: WO2020/043920
PCT Pub. Date: Mar. 5, 2020

(65) Prior Publication Data
US 2021/0203768 A1   Jul. 1, 2021

(30) Foreign Application Priority Data

Sep. 1, 2018 (EP) .................................... 18192139

(51) Int. Cl.
*H04M 1/72424* (2021.01)
*H04M 1/72457* (2021.01)
*H04W 4/90* (2018.01)
(Continued)

(52) U.S. Cl.
CPC ........ *H04M 1/72424* (2021.01); *G06F 40/58* (2020.01); *H04M 1/271* (2013.01);
(Continued)

(58) Field of Classification Search
CPC ............. H04M 1/72424; H04M 1/271; H04M 1/72436; H04M 1/72457; H04M 1/72454;
(Continued)

(56) References Cited

U.S. PATENT DOCUMENTS

2007/0139182 A1* 6/2007 O'Connor ............... H04W 4/90
340/539.22
2008/0284587 A1* 11/2008 Saigh ................ H04M 1/72424
340/539.13
(Continued)

FOREIGN PATENT DOCUMENTS

WO   WO-2018045434 A1 *  3/2018 ............. G08B 13/19

*Primary Examiner* — Farid Seyedvosoghi

(57) ABSTRACT

A method for generating an alert and an electronic message from a mobile smartphone comprising a display and various sensors including a GPS sensor, the method comprising the steps consisting of: —downloading, to a smartphone, a remote support application comprising the implementation of a service for controlling the microphone, even in the event of the phone being locked; —activating the sensors present in the mobile phone in order to collect information linked to the environment of the mobile phone; —carrying out a contextual analysis of the information collected by the sensors in order to determine an emergency situation requiring an alert to be triggered.

15 Claims, 9 Drawing Sheets

(51) Int. Cl.
*G06F 40/58* (2020.01)
*H04M 1/72436* (2021.01)
*H04M 1/72454* (2021.01)
*H04M 1/27* (2006.01)
*H04W 4/021* (2018.01)
*H04W 4/14* (2009.01)

(52) U.S. Cl.
CPC ... *H04M 1/72436* (2021.01); *H04M 1/72454* (2021.01); *H04M 1/72457* (2021.01); *H04W 4/021* (2013.01); *H04W 4/14* (2013.01); *H04W 4/90* (2018.02); *H04M 2250/10* (2013.01)

(58) Field of Classification Search
CPC ... H04M 2250/10; G06F 40/58; H04W 4/021; H04W 4/14; H04W 4/90; G08B 25/016
See application file for complete search history.

(56) References Cited

U.S. PATENT DOCUMENTS

| | | | | |
|---|---|---|---|---|
| 2011/0130112 | A1* | 6/2011 | Saigh | H04M 1/72424 455/404.1 |
| 2011/0319051 | A1* | 12/2011 | Reitnour | H04W 4/185 342/357.55 |
| 2012/0002791 | A1* | 1/2012 | Kraus | H04W 76/50 379/37 |
| 2012/0295575 | A1* | 11/2012 | Nam | G08B 25/016 455/404.1 |
| 2014/0349603 | A1* | 11/2014 | Waterhouse | H04W 4/90 455/566 |
| 2015/0288797 | A1* | 10/2015 | Vincent | G16H 10/60 455/404.2 |
| 2017/0162032 | A1 | 6/2017 | Gellman et al. | |

* cited by examiner

Alternate process of voice control for launching an alert

Process for requesting GPS location in a off-network area

METHOD FOR TRANSMITTING AN ELECTRONIC ALARM VIA A SMARTPHONE, AND DEVICE FOR IMPLEMENTING THE METHOD

TECHNICAL FIELD

The present invention relates to the field of remote assistance and more specifically to a method of transmitting an alarm via a data processing device, such as a smart phone.

BACKGROUND ART

Multiple solutions exist on the market allowing a user to generate an electronic alarm via a mobile data processing device, such as a smartphone.

In general, these solutions consist of an application installed on the phone, for example an Android or iOs type application, making it possible to generate and transmit an Short Message Service (SMS) alert message to a subscriber number, or even a remote assistance center. The most sophisticated conventional solutions also result in the transmission of geo localization information in the SMS allowing a central remote assistance service to quickly locate the person in unsafe situation.

These solutions are eminently useful, especially in certain countries where the security of goods and people is not assured.

However, it remains desirable to be able to benefit from a global and complete solution, integrating the great diversity and multiplicity of information which is likely to be collected by a smart mobile phone to significantly increase the security of individuals, regardless the particular brand, type and operating system of that phone.

This is the technical problem to be solved by the present invention.

SUMMARY OF THE INVENTION

It is an object of the present invention to integrate security at the heart of the daily activity of users of mobile and smart phones, by proposing a method making it possible to collect and gather a diversity of various information in order to detect and react to various unsafe situations for the physical security of the user, and by the automatic triggering of an alert on a mobile telephone, comprising the simultaneous generation and transmission of a telephone call, an electronic message and an email to a central remote assistance or to someone close to the user.

It is another object of the present invention to provide an alert method to be used on a mobile telephone, which generates and transmits a message incorporating the geolocation of a user being in distress.

It is another object of the present invention to provide a method of triggering an alert on a mobile phone and generating and transmitting an electronic message based on a voice command.

It is another object of the present invention to provide a method of alerting usable on an intelligent mobile phone based on a touch control on the screen or on the "Volume" key.

It is another object of the present invention to provide a method of contextual analysis of a situation of danger or risk for a user of the telephone, and of triggering an alert in the event of excessive risk.

It is another object of the present invention to provide a method for alerting usable on a mobile telephone and for generating and transmitting an electronic message incorporating the dimension of indisputable identification of the user in distress by the various facial/digital recognition methods.

It is a further object of the present invention to provide a method for alerting usable on a mobile telephone and for generating and transmitting an electronic message incorporating the central principle of confidentiality of information collected and processed only in the mobile telephone and on the basis of 1024-bit encryption process.

It is another object of the present invention to provide a method for sending an SMS even in the absence of a network and to turn a conventional smart phone into a true "security assistant" for a user.

It is another object of the present invention to provide a method for sending a automated voice message when the user is unable to speak to transmit his identity and the geolocation information also transmitted by SMS, even off the grid.

It is another object of the present invention to provide an instant automatic voice translation method allowing the user of the application to be able to converse in his native language with an interlocutor speaking in another language.

The invention achieves these goals by means of a method for generating a voice or tactile alert and an electronic message and an email from an intelligent mobile telephone comprising a display and various sensors including, in particular, a GPS sensor, an accelerometer, an altitude sensor and a gravity sensor, the method comprising the steps of:
  download in a smart phone a remote assistance application which causes the setting up of a microphone control service even if the phone is locked;
  activate the sensors present in the mobile phone so as to collect information related to the environment of the mobile phone;
  carry out a contextual analysis of the information collected from the sensors to determine the presence of an emergency situation requiring the triggering of an alert.

In a particular embodiment, the contextual analysis comprises the following steps:
  a detection of a "double click" on a button on the display and/or a specific area of said display;
  a detection of a "long press" on a specific area of said display;
  a predefined combination of long presses and short presses,
  a detection of a voice command captured by the microphone;
  a contextual analysis of the information generated by the sensors present in said mobile telephone;
  a detection of the absence of a network for sending relevant information by SMS Preferably, the microphone controlling service periodically initializes the telephone so as to ensure, in all circumstances, the control of the audio microphone.

In addition, the phone is configured to receive audio messages of a maximum length or of a predefined nature, and to compare these messages with a library of predefined audio messages.

In a particular embodiment, the processing of the alert comprises the steps of:
  optionally invite the user to cancel the triggered alert (420);
  attempt (451, 452) a call directly to a remote assistance center or to a close contact defined in a list of N close contacts;

launch a communication session and transmission of a SMS (440) comprising the geolocation data of the mobile phone and the identification elements, for example, name, first name, IMEI of the phone;

said alert call procedure comprising the steps of:
- activate the audio microphone (457);
- activate the loudspeaker (458);
- secure storage of sensor data (459);
- SMS & sensor data transmission (460).

Preferably, the contextual analysis step includes the steps of selecting either an intermittent tracking mode or a tracking to destination mode. The intermittent tracking mode then consists of carrying out, at regular intervals, comparisons of successive geolocation data to determine one or more identical geolocations and initiate an alert detection. On the contrary, the tracking to destination mode involves the setting by a user of a destination location, of a Tolerable Delay (RT), a Tolerable Deviation (ET), to the destination, and real-time calculation of the Effective Delay (RE), and Effective Deviation (EE) and their respective comparison with RT and ET to trigger an alert processing procedure.

Preferably, the parameter values of the method, such as RT and ET for example, are determined in profiles previously stored in the mobile telephone.

The invention also allows the realization of a mobile data processing device, such as a smart phone, allowing wireless communication within a cellular network of the GSM type, and allowing, through the downloading of a specific application, the implementation of the method described above.

DESCRIPTION OF THE DRAWINGS

Other characteristics, aims and advantages of the invention will become apparent on reading the description and the drawings below, given only by way of non-limiting examples. In the accompanying drawings.

DESCRIPTION OF THE PREFERRED EMBODIMENTS

Figure 1:
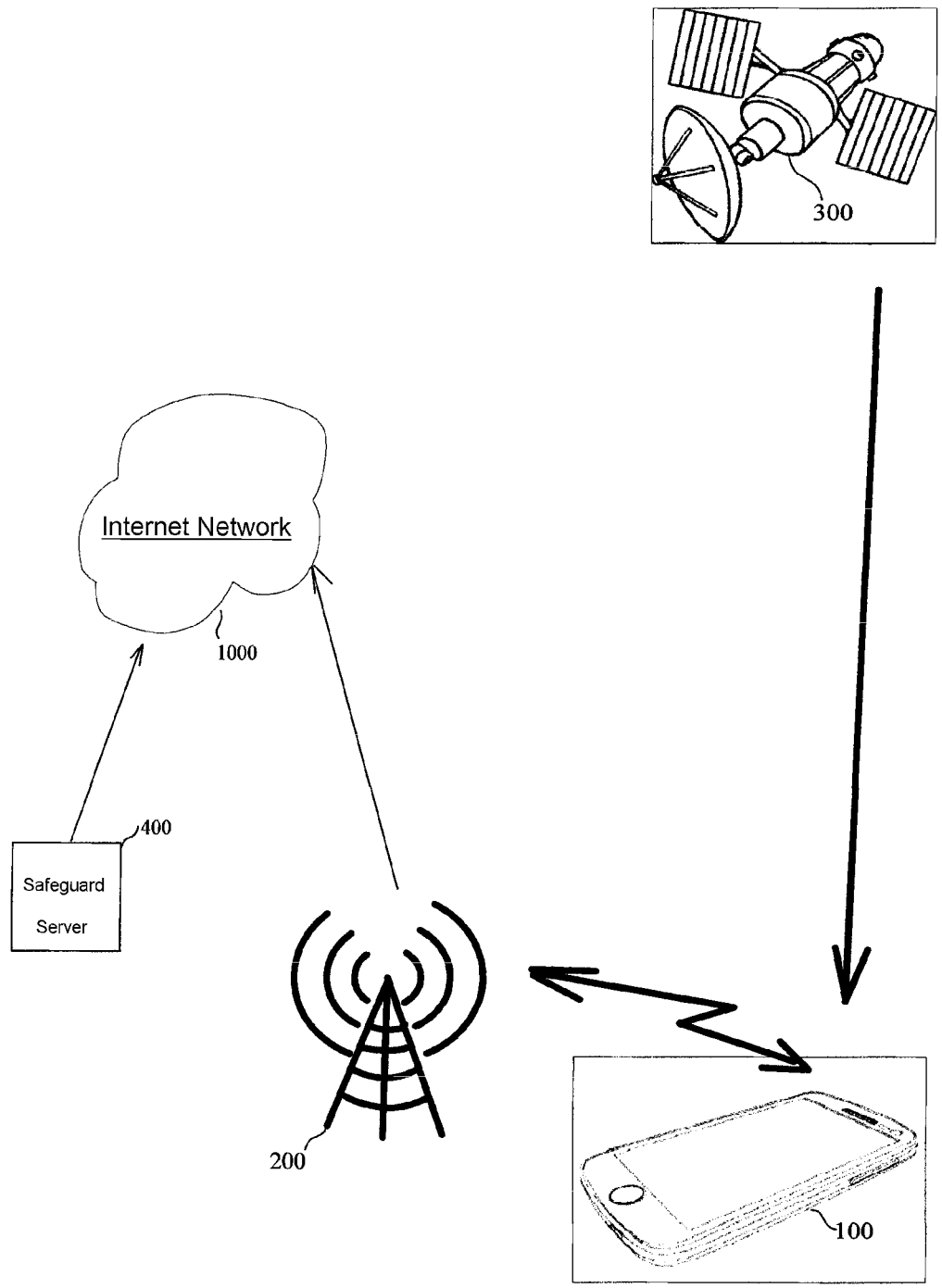
FIG. 1 is a general view showing a mobile phone communicating through a base station within a cellular network, and also receiving geolocation information from a satellite.

The reader will note an important observation, namely that the application is designed as a system native application which is directly integrated within the operating system of the smartphone and which controls the various sensors installed, and which processes the information from those sensors without any intermediate filter.

The application is therefore completely independent of the operating system being installed within the smartphone, and such design allows a smartphone manufacturer to provide such functionality as a primary functionality available in the smartphone irrespectively of the operating system.

Definitions

1. Smartphone:

In the description below, the term "smart phone" is used as any mobile or fixed telecommunications device incorporating the following functionalities:
- Sending/receiving a phone call
- Sending/receiving SMS and/or MMS
- Taking a photo by an integrated camera or not
- The detection or recording of sounds by an integrated microphone or not
- The geolocation of said device
- Detection of movement or displacement of said device 2. Alert/Alarm:

In the text below, is designated under the terms "Alert or Alarm" a priority electronic communication, to an identified receiver, individual or structure organized for the reception of emergency calls, such as a remote assistance or remote monitoring center, generated by processing external or internal data collected by a smart phone, said communication including:
- A phone call automatically without intervention from the phone holder
- A sending of an SMS including:
  - elements of geolocation and identification of said phone
  - elements of identification of the bearer of said phone
  - elements explaining the situation of the holder of said telephone
- A sending an email including:
  - elements of geolocation and identification of said phone
  - elements of identification of the bearer of said phone
  - elements explaining the situation of the bearer of said telephone NOTE: In the particular circumstance where no network is accessible, the alert is achieved by:
- Sending an SMS including:
  - elements of geolocation and identification of said phone
  - elements of identification of the bearer of said phone
  - elements explaining the situation of the holder of said telephone 3. GPS Geolocation:

In the text below, is designated under the terms "GPS geolocation or GPS location", information indicating the position of a smart phone and therefore of its user, by a process making it possible to position said phone using its geographic coordinates using a satellite positioning system. The expression 'GPS geolocation or GPS location' cited above and in the rest of this document generically covers all positioning systems by satellites such as the American GPS (Global Positioning System), the Russian GLONAS, the European Galileo, the BEIDOU-2 Chinese, and future Japanese QZSS and Indian IRNSS and any other future system, thus underlining the universal character of the present application.

4. Operating System

In the text below, is designated by the term operating system, the program executed when starting up the smart phone and acting as an intermediary between the software and the hardware, in this case, said phone clever.

In the text of this document, it is understood that the application is designed as a system application to be adaptable on all operating systems such as Android, iOs, Windows Phone, Symbian, Harmony Os and other operating systems in the future, thus underlining the universal character of the present application.

5. SOS Beep or SOS Digital Beep:

For reading convenience, the application, subject of the invention presented below, may be referred to as:

Bip SOS

Digital SOS beep

The application

6. Alert or Voice Command:

The terms "voice alert" and "voice command" used in the text below generically describe the word, phrase or phrase defined to trigger an alarm by voice.

FIG. 1 illustrates the general architecture of a preferred embodiment of the invention, which consists of a mobile data processing device, such as a smart phone 100, of the iPhone type (trademark registered by the company Apple Computer Inc.) or Android for example, allowing wireless communication within a cellular network of GSM type, represented by a base station 200 providing voice and data communication, as well as access to an Internet network 1000 and, consequently, to one or more servers including a remote assistance server 500 which will be implemented in the procedures which will be described below in more detail.

Furthermore, the mobile telephone 100 receives geolocation signals emanating from a set of satellites—such as the satellite 300 illustrated in FIG. 1—via a GPS receiver included in the telephone.

Figure 2:
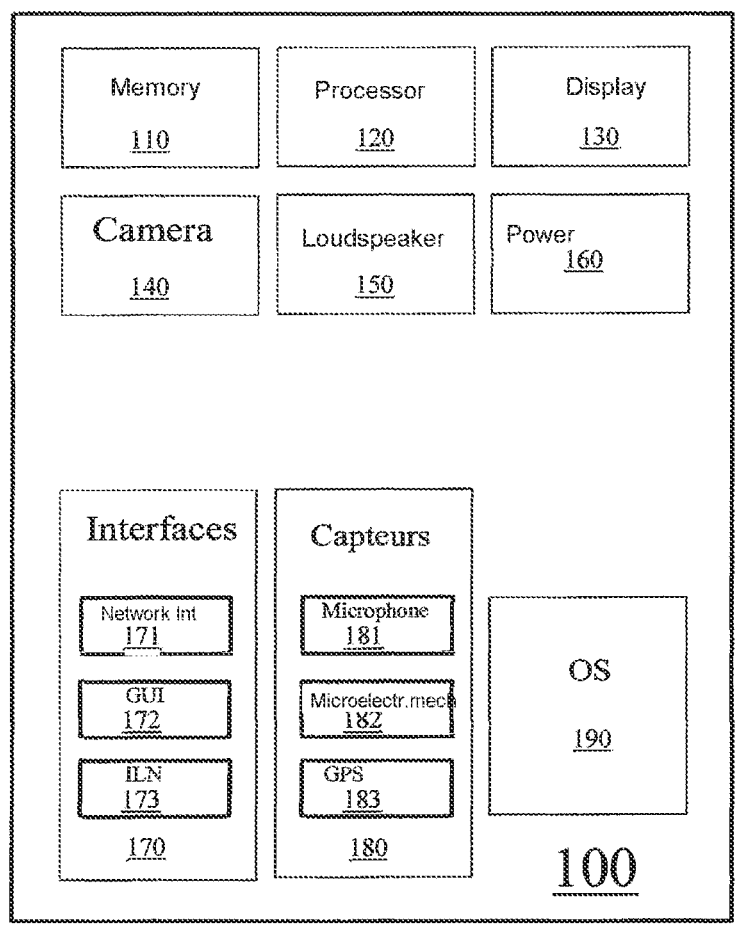
FIG. 2 shows the functional blocks cooperating in the mobile and/or smart phone according to a preferred embodiment of the invention.

FIG. 2 illustrates more specifically the general architecture of the smart phone 100 of FIG. 1.

The telephone 100 includes a memory 110 distributed in one or more electronic components and allowing the storage of computer programs and data, including an operating system as well as various applications. The telephone then comprises a processor 120 allowing the execution of the applications and the processing of data, as well as a display 130—generally tactile—making it possible to display the data to a user via a Graphical User Interface (GUI). The telephone 100 comprises a camera 140 intended for taking pictures 140, a loudspeaker 150 associated with its amplifier circuit, as well as a power supply 160.

The telephone 100 further comprises a block 170 comprising various interfaces, in particular a network interface 171 allowing wireless communication with various GSM, WIFI, Bluetooth, etc. networks for access to the Internet network, but also to a LAN network (Local area Network), WAN (Wide area Network) etc. well known to a person skilled in the art and need not be described further. The interfaces block 170 also includes a graphical user interface GUI 172 mentioned above, and even also an ILN 173 natural language interface capable of recognizing voice instructions received from a user.

The telephone 100 then comprises a block 180 comprising multiple sensors making it possible to generate multiple information and signals representative of a user's environment. More specifically, the block 180 comprises an audio microphone 181, a micro-electromechanical sensor 182 such as an accelerometer for example, an optical sensor, an RFID identification sensor, a GPS sensor 183 (Global Positioning System) for receiving geolocation signals emitted by geostationary satellites, but also an integrated compass, a gyroscope etc.

As will be seen below in more detail, one of the significant contributions of the invention consists in making use of all the information likely to be collected by the numerous sensors and network interfaces, to bring together a set of data making it possible to perform Contextual analysis useful in determining the security conditions of the phone user.

With further reference to FIG. 2, it can be seen that the memory 110 of the telephone 100 is intended to receive, in addition to the data produced by the various sensors and/or received from the various interfaces, a set of programs and software allowing the operation of the software for the management of calls and access to the Internet, and also the implementation of the methods described below. Among these programs is quite naturally an operating system (OS) 190 ensuring the general control of the operation of the telephone 100, which may for example be of the ANDROID type. In addition to the operating system, the memory 110 will be used to store a specific application in accordance with the present invention, which will be described below in detail, and which will make it possible to integrate security at the heart of the daily activity of the user's telephone.

In general, this specific application can be downloaded in a conventional manner from a download server (not illustrated), well known to a person skilled in the art.

Once downloaded, this application will, as we will see in detail, configure the smartphone to allow it to set up "contextual" security intended to increase the security conditions of the user of the smartphone.

Figure 3:
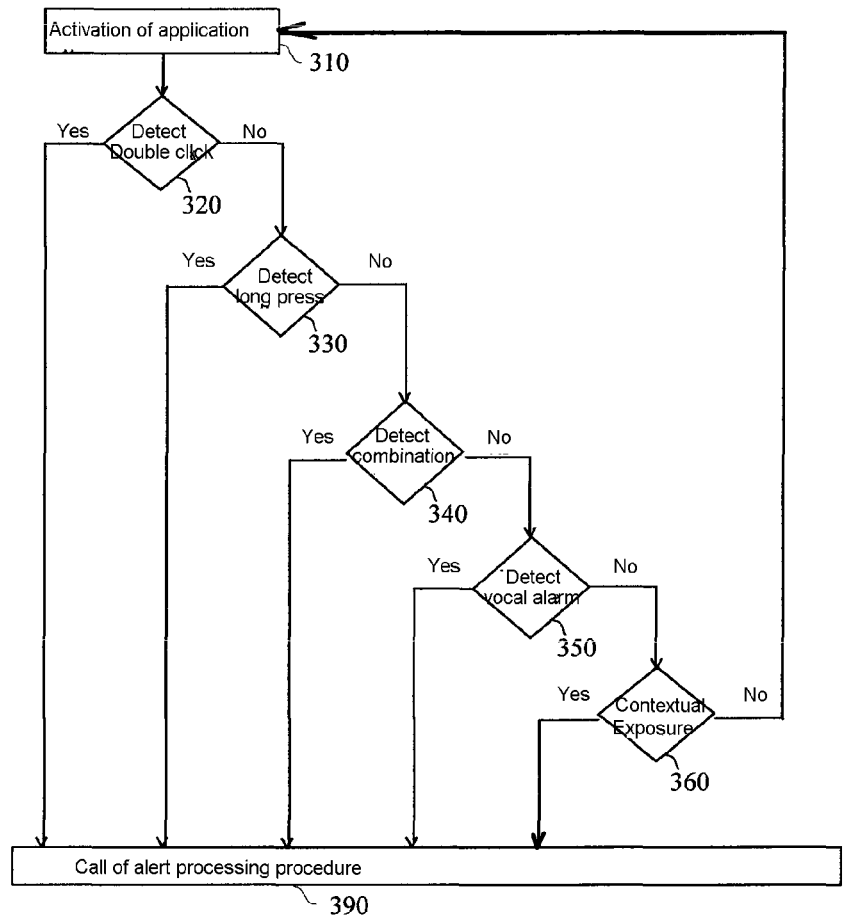
FIG. 3 illustrates one embodiment of a contextual analysis method allowing the detection of a critical situation, in various given situations and contexts.

FIG. 3 more specifically describes an example of a contextual analysis method in accordance with the present invention making it possible to carry out a detailed analysis of the security conditions of a user with a view to detecting a critical situation for the latter, with the aim of generate an alert to be transmitted by telephone.

The method of FIG. 3 starts with a step 310 which corresponds to the launch of a specific application, organizing the management of the user's physical security, and which will enable the implementation of the various procedures described below.

Typically, step 310 is an advantageous modality for the user who wants to remain in control of the operation of his telephone and who wants to keep control of the latter.

Alternatively, according to another embodiment, a person skilled in the art could implement some of the method steps described below in the form of a "service" to ensure the execution of the routines described below as a backdrop to the daily operation of the smartphone. Indeed, as is known to a person skilled in the art, a "service" is classically considered, unlike an "activity", as being able to operate in the background of the mobile telephone, and without resorting to a graphic interface.

In a preferred embodiment, launching the security application leads to the display of a specific button in a specific area of the screen, appearing in clear or superimposed over the other applications displayed and which will advantageously allow the user to keep an opportunity of a direct action on the mobile.

In a step 320, the method performs a test to determine whether the user performs a "double click"- or a short press (for example for a duration equal to + or −5 seconds) on the touch screen of the smart phone, in particular on the area reserved for this location. This step clearly allows the user, who exercises his free will, to determine for himself whether he is in a critical situation likely to call for the need for adequate safety processing, as will be illustrated in the FIG. 4. Clearly, other possibilities may be considered by a skilled person, such as for example the detection of a double click or a long press on a specific button on the phone, originally allocated to another function.

In a particular embodiment, when the mobile telephone is provided with a fingerprint capture device, the method leads, upon detection of a short press, to the simultaneous capture of the fingerprint of the user.

If a "double click" is detected, the method then goes to a step 390 which will allow the call to the procedure for processing an alert which will be described in relation to FIG. 4.

If the text of step 320 does not make it possible to establish a "double-click", then the method goes to a step 330 aimed at detecting a "long press"—for example of at least 3 seconds—performed by the user on a specific area or not of the touch screen of the smart phone 100. As before, if the mobile is equipped with a device for capturing fingerprints, the method can advantageously proceed with the storing of this fingerprint in order to confirm, subsequently, the identity of the person who performed the long press.

If a "long press" is detected, the method goes to step 390 and, if not, the method continues with an optional step 340 aimed at detecting a specific combination of "short" and "long presses" performed by the user on any area of the touch screen of the smart phone 100.

Thus, as can be seen, the combination of steps 320, 330 and 340 allows multiple alert detection methods, based on the "double click" and "long press" making it possible to distinguish two specific cases of alert, but also any combination thereof. For example, the long press may be more specifically useful when the detection process of FIG. 3 is taking place in the background, while the double click will be advantageous when the application displays a window or an activation button. In the very general case of a combination of "short" and "long" presses, this will allow the user to safely command an alert to be triggered by performing the specific preset combination of clicks. For example the successive combination of 'three short presses', followed by 'three long presses' and followed by 'three short presses', will correspond to the well-known SOS alert message, which will trigger the immediate implementation of the alert processing procedure of FIG. 4.

If the test of step 340 leads to the detection of a specific combination of presses, the method goes to step 390 and, if not, the method continues with a step 350 consisting of a detection of a voice alarm spoken by the user and detected by the microphone of the mobile phone.

Indeed, if, as can be seen, the method of FIG. 3 allows great flexibility linked to the various methods of triggering an alert on the telephone via "touch" pressing. The method of FIG. 3 offers two additional highly useful methods, namely a voice detection in relation to step 350 and a contextual analysis in relation to step 360.

The voice detection of step 350 aims to detect either one or more predetermined words or set of phonemes (such as "Alert", "Help"), or audio messages previously recorded by a user and stored in the memory 110 of the mobile phone.

In a preferred embodiment, this step 350 uses a specific "service" allowing control of the microphone 181, even if the telephone is locked.

More specifically still, the mobile telephone can be configured to perform a recognition of the voice print of the user, so as to compare this voice print with a reference voice print previously stored in the memory of the telephone and thus validate the voice alert pronounced by the user.

The voiceprint recognition mode is universal and applies to all languages, idioms and accents of human societies but can also be applied to the processing of sounds produced by animals, machines and other artificial sound productions.

More specifically still, in the case of a "video" or "photographic" capture, the mobile phone can be configured to compare the capture with an image previously stored in the phone to, if necessary, validate the voice alert pronounced by the user.

As is known to a person skilled in the art, there are three types of services:
- the local service (designated by the designations "started" or "unbound" where the activity which launches the service and the service itself belong to the same application.
- the remote service, ie launched by a component that belongs to another application (referred to under as boundservice). In this scenario, there is still an interface that allows communication between the process that called the service and the process in which the service is running.
- the service that borrows from both statuses at the same time. Thus, we can start a local service and allow it to accept remote connections later.

In the preferred embodiment, the microphone is controlled by means of an "unbound" type service, referred to as "speech service", SS. The SS service is an independent local service for taking control of the physical microphone of a smartphone in order to continuously capture the audio results. That is to say continuously and not intermittently. In a preferred embodiment, the SS makes successive audio recordings of a given period, for example 5 seconds. To ensure constant monitoring of the microphone 181, the initialization of the latter is carried out at regular intervals, for example every 5 seconds.

More specifically, the operation of the SS service is as follows:
  take control of his microphone
  Initialization of the speech package: call to several internal classes of the unbound service to be able to process the audio data:
    Initialization class: start of listening
    Exception class: obtaining the various possible errors during listening
    Library Class: obtaining comparison dictionaries
    Speech Class: processing of the results listened by the microphone with respect to the comparison dictionary
  Listening for 5 seconds, processing, comparison and return of the result to the application.
  Restart listening.
  Classes:
  Initialization: The initialization class retrieves the drivers needed for starting the capture by the microphone, the packages differ depending on the phone used but the process remains the same. After retrieving the drivers, this class points the phone's microphone to the SS service in order to retrieve the saved data.
  Exception: The Exception class manages the various errors related to listening mobile phone microphone. Indeed, several types of errors are to be managed while listening to the microphone, this class therefore manages its various exceptions so as not to block the service and thus not jeopardize the listening service.

Library: The Library class is a class in which are stored all the different constants used for processing the listening data of the application. By default, the main constant retained among others of this library is the term "HELP", which is stored in several pronunciation modes, in order to be sure to be recognized by the service at any time of listening via microphone, in all languages Speech: The speech class is the class that uses all the other different classes of the service. It launches initialization, exceptions and retrieves libraries. When listening, the speech class retrieves the data recorded by the microphone of the smartphone and stores this data in a temporary array type variable; this table will therefore be compared against the library, and for each result, positive or negative, this result will be returned to the security application, to determine whether it is an alarm or not. Listening is also restarted in the speech class, by calling, after the comparison of the results, the initialization class to avoid a phenomenon of data throttling as known in the English technical literature.

Thus, thanks to the implementation of the SS service, the method makes it possible to detect, in step 350, a voice alert formulated by the user. If the test of step 340 results in the detection of a specific combination of presses, the method proceeds to step 390 and, if not, the method continues with an additional optional step 360.

Step 360 completes the analysis of the security conditions carried out by the mobile phone, operating as a real "digital bodyguard", so as to conduct a contextual analysis carried out by the application—or the service if applicable—making it possible to carry out a detailed analysis of the environment in which the telephone user finds himself in order to determine a situation of excessive contextual risk, and to launch an appropriate alert.

For the implementation of step 360, the phone is configured to exploit multiple parameters, data and information generated by the various sensors existing in the phone and configured to determine a relevant conceptual risk that can be taken into consideration and to lead to a positive test for this step 360.

In general, all the information collected by the sensors present in the phone is collected and used to infer an assessment of the security conditions in which the user of the mobile phone finds himself.

According to one embodiment, the data produced by the electromechanical sensors are taken into consideration, and in particular those emanating from the accelerometer and/or the gyroscope to detect the conditions of a shock or of a fall of the user which might require to call a remote assistance service. More specifically, and this is a considerable advantage resulting from this contextual analysis, the mobile phone is configured to detect, thanks to the diversity of the sensors implemented, a horizontal impact originating from a collision with a vehicle, for example, from a vertical shock resulting from a fall of the user. Thanks to such distinction, made possible by the collective use of information from the sensors, the alert processing method will be able to deal in a differentiated manner with the critical situation detected and allow, for example in the event of a shock, horizontal or vertical, implement a detailed measure.

According to another embodiment, the application may be configured to use general information, such as the time or the geolocation data coming from the GPS sensor 183, to determine the presence of the user in a potentially "risk exposure" environment. Thus, a user practicing border jogging or immersed in a somewhat isolated forest may be detected as being in a risk situation, which will be detected by the telephone as being capable of launching the processing method of FIG. 4.

Furthermore, the information provided by the interfaces and in particular the network interface could be used to supplement the information collected by the sensors and integrated into the contextual analysis process of step 360. In particular, the GSM interface will give a useful indication of the presence of the cellular network and the possibilities of communication. More specifically, the application will be configured to use one of the following signals from the network interface: signal to noise ratio, SNR; a signal to interference plus noise ratio, SINR; a reception power of the reference signal, RSRP; a received reference signal quality, RSRQ; a radio link quality, RLQ; an indication of the strength of the received signal, RSSI; and a channel quality indicator, CQI. All this information allows the mobile phone to know precisely the communication conditions within the cellular network, in particular if a base station is about to be too far away without a second station being able to take over, and the specific application allows the mobile phone to be configured to use this information and enrich the contextual analysis of step 360 with these indicators relating to the quality of the communication. Clearly all of these indicators will make it possible to detect an abnormally risky situation, for example, such as the situation of a user who practices his jogging and who arrives in a situation far from a base station of a cell network. In this case, this situation will be detected and anticipated in step 360 as problematic since a GSM communication may not be able to be completed.

More generally, all the sensors appearing in the block 180 of the telephone 100 are called upon to use their data to allow, where appropriate, a detection of a risky situation and, consequently, a positive test for step 360, in which case the method continues with a step 390 aimed at processing a security alert. Otherwise, the method goes back to step 310.

Figure 5:
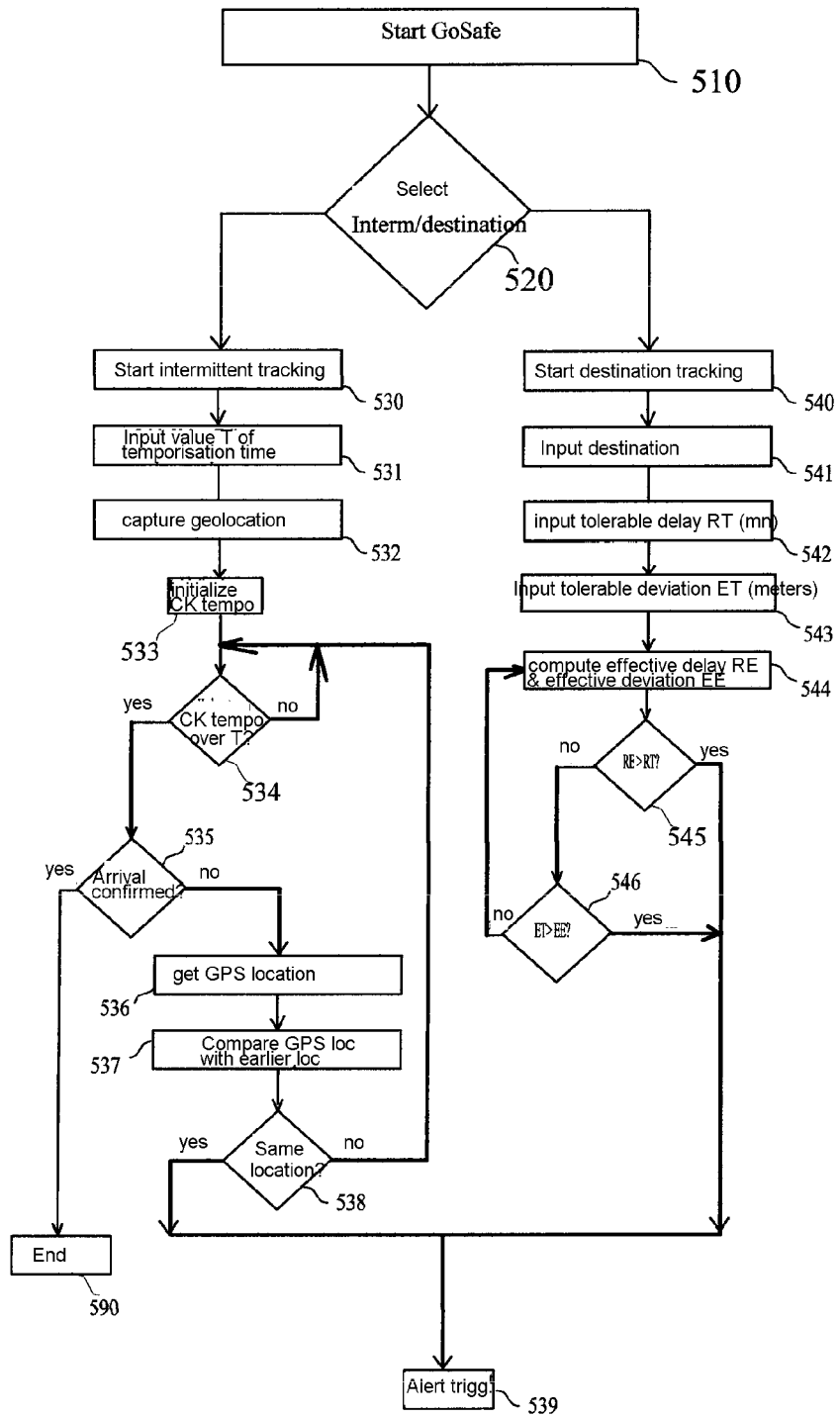
FIG. 5 illustrates a specific embodiment of the contextual analysis method of step 360.

To show the generality of this contextual analysis, we will describe in more detail with FIG. 5, specific modalities (GO SAFE and HOME) of a contextual analysis of security conditions.

As can be seen from the preceding discussion, the method of FIG. 3 allows the conditions of an environment of great vigilance offering the user the means to confront various situations of risk to his physical security.

Figure 4:
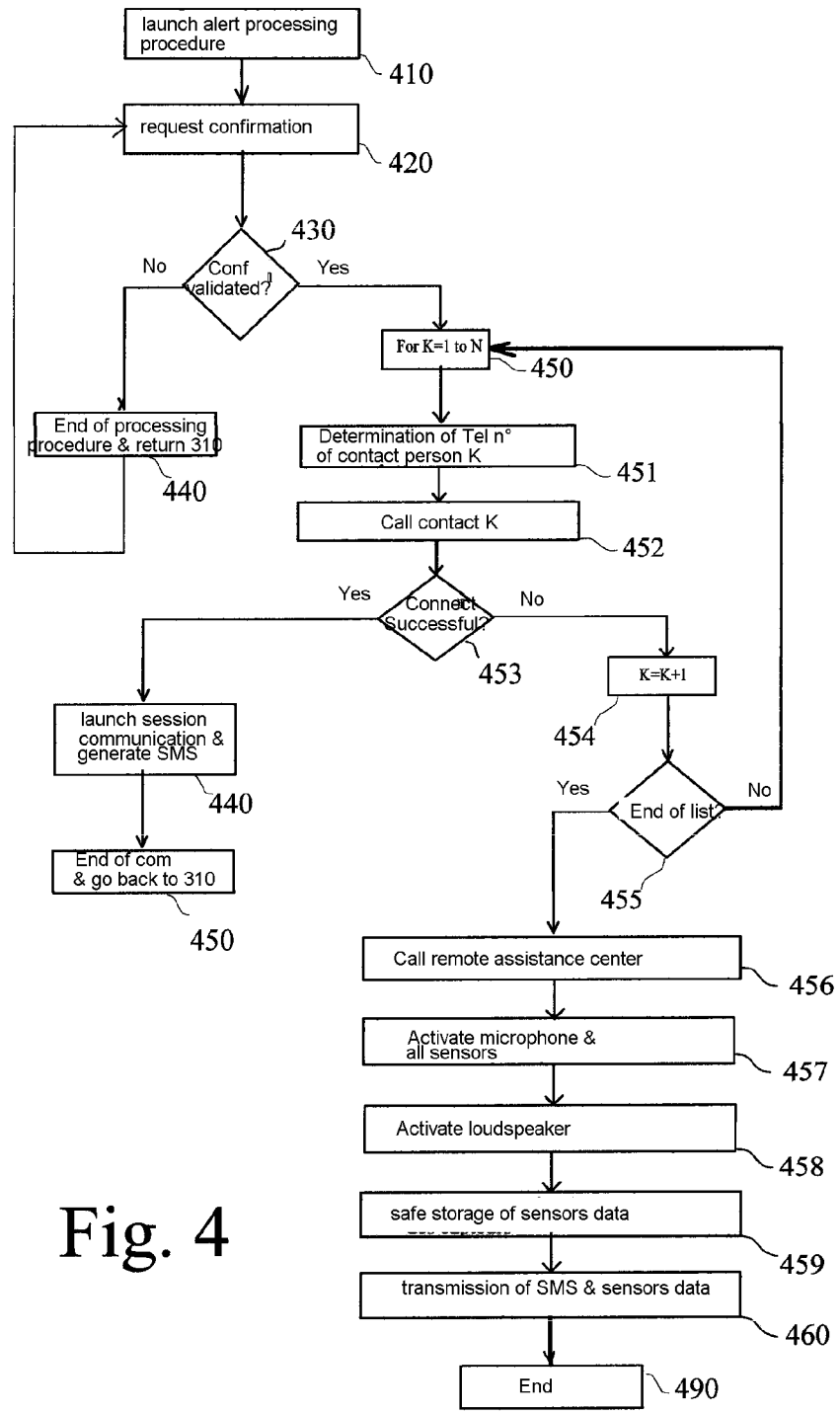
FIG. 4 illustrates more specifically the process for dealing with a critical situation, implemented following a detection resulting from the process of FIG. 3.

We will now describe, in relation to FIG. 4, the process for processing a critical situation alert, which starts with a step 410.

Then, in a step 420, optionally, the method continues with a request for confirmation which can be, as the case may be, expressed by a voice message or by a display on the screen. It is clear that a person skilled in the art will be able to adapt this step 420 to the specific conditions and circumstances which led to the detection of the alert. Thus, in the case of a detection of a combination of three short presses, then long presses, then short presses, the method can be configured to go directly to this step 420 insofar as the user's message is devoid of any ambiguity. The same observation will undoubtedly apply to a "double click" which can be considered as an unambiguous instruction to continue the alert processing. In other circumstances, such as when it was the contextual analysis block from step 360 that led to the alert processing process, the confirmation request may be useful in confirming whether to continue processing.

In a step 430, the method performs a test to determine whether the confirmation is validated by the user, in which case the method continues with a step 450. If the confirmation is not validated, then the method continues with a step 440 which is the end of the alert processing procedure and the return to step 310 of FIG. 3.

Step 450 corresponds to the initialization of an iterative FOR loop making it possible to test a list of numbers of N contacts previously stored within the application.

In a step 451, the application determines the telephone number of contact person K (with K=1 to N) then, in a step 452, the application attempts a first call to the contact K for a voice connection.

In a step 453, the method tests whether the connection with the contact K is successful, in which case the method continues with a step 440, allowing the launch of the communication session, accompanied, in parallel, by a transmission of an SMS (Short Message Service) containing the user's geolocation information, but also, as an option, an XML (eXtended Mark-Up Language) file containing data from the phone's sensors. Then, at the end of the communication, the method continues with a step 450 noting the end of the communication and then returning to step 310 of FIG. 3.

If the connection with the contact K is not successful in step 453, then the method goes to a step 454 aimed at incrementing the variable K in order to test the next contact on the list of N contacts.

In a step 455, the method tests whether the end of the list is reached. If one is not at the end of the list, the method returns to step 450 for the purpose of testing another contact within the predetermined list.

If the test of step 455 leads to a positive result, the method then continues with a step 456 aiming to initiate a call to a remote assistance center, which may be implemented by a specialized telephone call center, but also a server, such as the server 400 of FIG. 1.

Alternatively, the method can be configured to immediately launch, and simultaneously with step 450, the call to the remote assistance center which will then have the advantage of accelerating the processing of the alert and ensuring, in particular, security of the information transmitted to the alert center and their recording for later use.

In a step 457, the method activates the audio microphone and also all the sensors of the block 180 in order to allow not only the audio recording of the environment of the telephone but also the collection of all the information generated by those sensors. In a particular embodiment, the method will configure the mobile phone to also initiate video capture and not only audio.

Then, in a step 458, the method activates the loudspeaker to allow a user, possibly lying on the ground, to clearly hear the instructions given by the call center, and to communicate with the latter.

In a step 459, the method proceeds to secure storage of the geolocation information as well as of the information collected from the sensors of the block 180 within the memory 110. This information is stored in a secure area that cannot allow direct access, thus preventing an ill-intentioned individual from erasing this critical data.

Then in a step 460, if the communication with the remote assistance center and the server 400 so permits, the method proceeds to the transmission of an SMS message accompanied by the transmission of a file comprising all the data entered by the sensors as well as the audio/video message. In a particular embodiment, these data can be transmitted in an XML (eXtended Markup-Language) file comprising the data from the sensors of block 180.

In a preferred embodiment, the server 400 then proceeds, in a conventional manner, to a call to a remote assistance service involving, in particular, an attempt to contact the user, then the search for information relating to the user so as to call close contacts and, if necessary, the recourse to the public intervention to bring assistance to the user in distress.

When the communication ends with the remote assistance center, the method continues with a step 490 which is the end of the process.

As can be seen from the foregoing description, the application installed in the mobile phone makes it possible to significantly increase the safety conditions of the user, as they move around the city or on an activity field. By the cooperation of the various functionalities present in the machine, and the use of the numerous methods described above, the user is not provided with a simple "tool" for generating SMS, but a real hardware/software environment allowing the user to like a "digital boday", a significant security for the user, whether it is an elderly person, a single woman, a person victim of discrimination or a child.

We now describe, with the GO SAFE procedure, a preferred embodiment of the invention allowing a particularly advantageous contextual analysis which takes into account the calculation of routes that can be performed by the data processing system of the smartphone.

This GO SAFE procedure is a specific mode of contextual analysis of step 360 of FIG. 3, will be described below in relation to FIG. 5.

The method begins with a step 510 which is the launch of the GoSafe application or, alternatively, of a GoSafe service.

Then, in a step 520. a test is performed to ask the user to choose one of two methods, namely intermittent tracking, or tracking to destination.

Depending on the selection made by the user, the method continues either with a step 530 (intermittent tracking), or with a step 540 (tracking to destination).

In the case of intermittent tracking, the method continues, after step 530, with a step 531 during which is entered and stored in the telephone a value T of a timeout period chosen by the user.

The method then proceeds, during a step 532, to a first capture of the geolocation data of the telephone 100.

Then in a step 533, the method carries out an initialization of a clock or timing circuit.

In a step 534, the method performs a test to determine whether the clock circuit, which started to count from its initialization, has reached the value T previously stored in the telephone.

If the clock circuit has not reached the value T, then the method loops back to step 534 until the time corresponding to the value T.

At the expiration of the predetermined period T, the test of step 534 turns out to be positive and the method continues with a step 535 which is a test making it possible to determine whether the user confirms the arrival at the destination of his journey. Any confirmation may be considered, for example, validation by tactile pressure following an invitation generated by the system.

If the response to the test in step 535 is positive, then the process goes to a step 590 which is then the end of the GoSafe procedure.

If the response to the test of step 535 is negative, the method continues with a step 536 during which the telephone proceeds to capture the geolocation data and, in a step 537, the method proceeds with the comparison of that geolocation data with one and even two earlier geolocations previously stored at the initialization of the clock circuit or at the timeout of the latter.

In a preferred embodiment, the test of step 537 consists of comparing the GPS location with the two previous locations to determine if we have a sequence of three identical locations.

If a sequence of identical locations is observed, then the method proceeds to a step 539 which consists in performing the alert processing method as described in FIG. 4.

Otherwise, if the test of step 538 is negative, showing that the GPS location is constantly changing, then the method returns from step 538 to step 534 for a new reset of the clock circuit.

If the testing of step 520 resulted in the selection of track-to-destination, then the method proceeds from step 520 to step 540.

Then, in a step 541. the method continues with an invitation to the user to enter a particular destination. In a particular embodiment, the application will offer the possibility of using a list of favorite destinations, including in particular the home destination (HOME).

Then, in a step 542. the method proceeds further with inviting the user to enter a predetermined tolerable delay (RT), expressed in minutes, with respect to a calculated estimate of the time of arrival (Estimated Time Arrival).

Then in a step 543. the method continues with an invitation to similarly input a tolerable deviation ET (in meters) with respect to a defined path calculated by the "Map" service of the smart phone.

It should be noted that the RT and ET parameter values can be entered either at each iteration of the method of FIG. 5 or, in a particular embodiment, can be extracted from parameter values stored in previously saved profiles.

Once the configuration is complete, the method then continues, in a step 544 with a calculation—in real time—of an effective delay (RE) and an effective deviation (EE) calculated with respect to the path defined by the 'map' service of the smart phone, or by any route calculation and navigation software well known to a person skilled in the art.

Then, in a step 545, the method carries out a test to determine whether RE is greater than RT, in which case, the method goes to step 590 which consists of triggering an alert which will be processed according to the description below in relation to FIG. 4.

When the test of step 545 is negative, the method then continues with a step 546 which verifies whether ET>EE, in which case, as above, the method goes to step 590.

Otherwise, if the test of step 546 turns out to be negative, then the process loops back to step 544.

As we have seen, the method of the invention makes it possible to configure an intelligent mobile phone to provide all the information related to the environment of the phone and to centrally detect a risk situation for the user. In general, all the information detected by the sensors remains in the phone and is not transmitted to any server, which preserves the confidentiality of this personal data to the user. This data is only intended to be released from the "security assistant" by the downloaded application, in the event of a significant risk or a distress signal from the user. As soon as a situation of significant risk is detected, the processing of the alert is implemented and the telephone is then configured for a call to a remote assistance center 400—as well as to the telephones of relatives—to attempt to transmit, on the one hand, an SMS message but also a file comprising all the information related to the environment of the telephone and captured by the sensors.

This information file significantly supplements the information already contained in the SMS message, which only includes the geolocation and identification information of the phone/user.

It is therefore a considerable contribution of the invention to allow this information to be collected and safely transmitted to the host 400.

We will now describe a particular case allowing, in a somewhat extreme situation in which the mobile phone is not covered by any GSM network, to ensure the transmission of an SMS, for the case where the combination of the SMS with the file including the sensors data can not be jointly transmitted.

The invention proposed here provides a significant improvement in that it allows a message to be transmitted to the server even in situations of extreme isolation from the base stations of the cellular communication system.

In a particular embodiment, the method consists in adding to the smart mobile phone an additional accessory—in the form of a shell adapted to receive the phone—and allowing to add an antenna and an additional amplifier circuit to allow a true voice and data communication with a satellite.

Such a solution is known to a person skilled in the art and is marketed, for example under the trade name SatSleeve manufactured by the company Thuraya, and presented in particular at the following link:
https://www.zdnet.com/article/turn-cour-android-smart-phone-or-iphone-into-a-satellite-phone/

In this embodiment, the phone is equipped with an external amplifier and an application that allows the assignment of a satellite number allowing communication by satellite.

Alternatively, in another embodiment, the mobile phone can be configured to operate even without the external device having the specific antenna and the amplifier circuit. Indeed, it has been discovered that satellite communication is still possible even with the native antenna of a telephone. However, given the low sensitivity of a native antenna and without resorting to the use of an external amplifier and an application, one can only pass light traffic of data, such as SMS.

Consequently, in this latter embodiment, the application downloaded to the mobile telephone makes it possible to configure the latter to allow satellite communication based on the native antenna of the telephone which, although degraded, nevertheless allows the opening of the telephone. a communication channel for the transmission of an SMS.

Once this SMS has been sent to the remote assistance server, including the user's geolocation data, the remote assistance server can then take charge of the critical alert. One notes that this SMS can also be sent to a relative previously designated.

It should also be remembered that, with regard to satellite telephone numbers, these are unique identifiers assigned as unique telephone numbers.

In the last embodiment considered, the application downloaded to the smart phone uses an identification based on the IMEI (International Mobile Equipment Identity) number of the phone as a unique number, to establish satellite communications between two phones.

Thus, thanks to this arrangement, the downloaded application allows the establishment of a single communication channel between 2 smart phones allowing an exclusive link between a person in distress and an emergency contact.

Protocol Implemented

The IMMARSAT protocol for satellite communication via their APIs which allows us to find the usable and predefined frequencies, was used to calibrate the native antenna of the phone and establish communication with the satellite. This process can be generalized to any other satellite network.

As described above, the phone's IMEI number is used for identification of the recipient—usually the call center—but also the sender.

Thus, the method described makes it possible to establish, in a very advantageous manner, a possibility of communication between two mobile telephones comprising the application described above.

More specifically, the operation of the application is as follows:

After a network test in the application downloaded to the phone—hereinafter referred to as BIPSOS for convenience, a class is called to handle the sending of data via satellite.

When an alarm is triggered, a network test is launched in the application—hereinafter referred to as—BipSOS.

In the absence of a network, a class is called to handle the sending of data by satellite.

The process proceeds as follows:
1. Take control of the physical antenna by the application:—The class takes control of the physical antenna of the application in order to implement a process consisting of:
    change the frequency to adapt it to the frequency required by the satellite
    synchronize with the frequency used by Immarsat Satellite to send an SMS to the remote telephone In practice, in a particular embodiment, this takeover is carried out by executing an assembly code. Indeed, this then makes it possible to lower the language level to a system language, in order to better manage and lighten the package of information processed and to ensure the change of frequency.

A class then retrieves the geolocation data from the GPS chip via a retrieval function provided (intended for developers) by all smartphone manufacturers.

Then the class calls the assembly code; a so-called "calibration" program, written in assembly language, "evaluates and formats" the native antenna of the smartphone to orient it to the frequency supplied by Immarsat Satellite.

Calibration is expressed by a change in frequency, via the so-called calibration program. The information is processed in assembler via codes similar to this:

using the maximum level provided by the native antenna of the smart phone (between 700 MHz to 2700 MHz)

The "data packet is sent to a recipient identified by its IMEI (unlike satellite phones which use their own numbering system).

Identification by IMEI is the first step in a strategic direction for the indisputable identification of the person raising the alarm. This is because this process also collects additional information such as fingerprints, voice and facial prints.

This process is implemented in the user's phone by means of the specific BipSos application. It is also installed in the phone of the emergency contact ("satellite contact") which allows each phone to be able to send and receive SMS, via the Immarsat satellite link.

It is reminded that this operation of sending an SMS from a smartphone is also valid at reception. This transmission/reception process is made possible by:
on one hand by running the calibration program on each device,
on the other hand, by the reciprocal and compulsory identification of the sender and the receiver.

It should be noted that the operation of sending/receiving an SMS between two smartphones does not require the intervention of any external server. The process therefore guarantees the total confidentiality of the information exchanged. Obviously, it could be advantageous to set up an SOS exchange between the telephone and an external server, such as the server 400.

Figure 6:
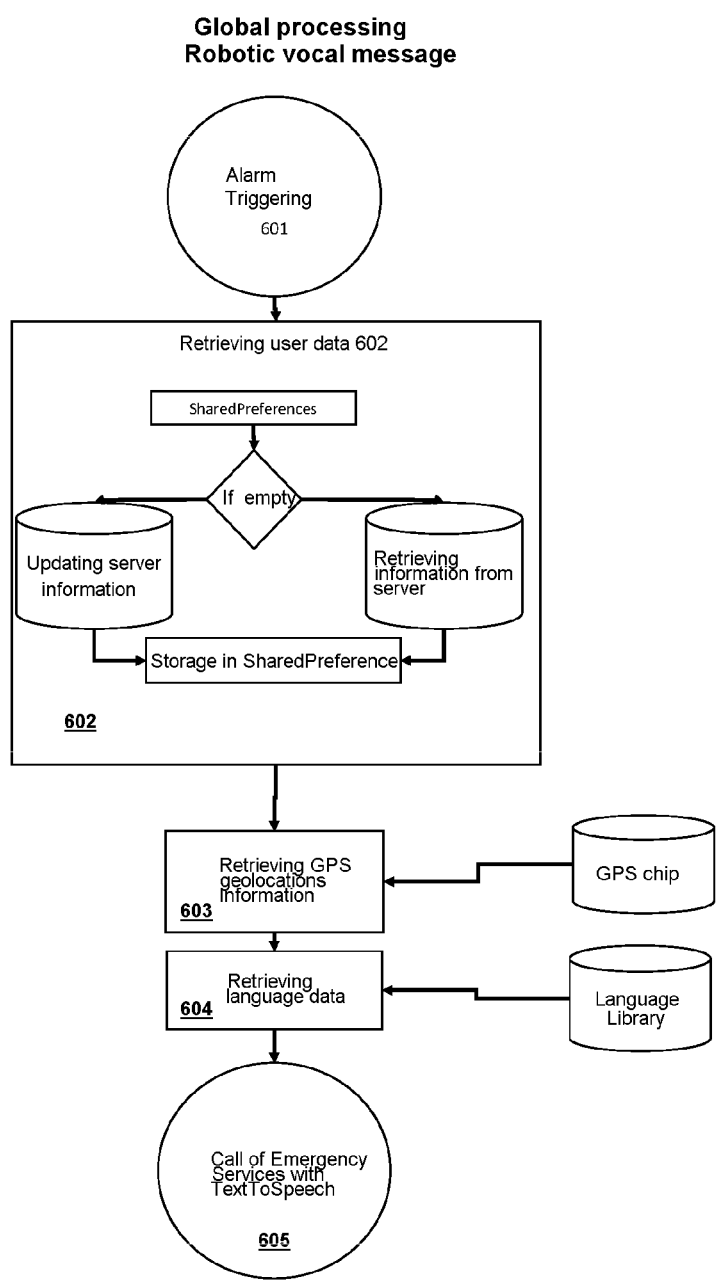
FIG. 6 illustrates a specific embodiment of an overall process of a robotic voice message.

We now describe a particular embodiment aimed at the establishment of an robotic speech message, as illustrated with steps 601-608 of FIG. 6.

The process starts with a step 601 which is the triggering of an alarm.

Then, in a step 602, the method performs a recovery of the user information stored in the Bip SOS application via the Android native class or iOS which is named SharedPreferences.

Then, in a step 603, the method performs the retrieving of the GPS geolocation information. The user's GPS location is provided natively by the GPS chip integrated into the smartphone. This therefore also makes it possible to locate the user in relation to the country of residence from which he recorded the SOS Bip and thus know whether he is traveling outside the country.

| | |
|---|---|
| - mov ax, O0 ' | ; "initialize to ail ASCII zeroes" |
| - mov di, counter | ; "including the counter" |
| - mov cx, digits + cntDigits / 2 | ; "two bytes at a time" |
| - cld | ; "initialize from low to high memory" |
| - rep stows | ; "Write the data" |
| - inc ax | ; "make sure ASCII zero is in al" |
| - mov [num 1 + digits − 1], al | ; "last digit is one" |
| - mov [num2 + digits − 1], al | ; |
| - mov [counter + cntDigits − 1], al | |
| jmp .bottom | ; "done with initialization, so begin |

After this calibration operation, the data "packet" now weighs 140 to 1000 bytes depending on the architecture of the smartphone processor because the assembler code differs depending on the architecture of the processor: x86 (32 bits) or x64 (64 bits). It is therefore formatted to be able to be processed in signal level accepted by the native antenna of the smartphone The "data packet is then sent on the frequency: 1525-1559 MHz and 1626.5-1660.5 MHz of the Immarsat satellite The user's position can also be known, if applicable, via the roaming system provided by his telephone provider, based on the changing country code.

In a step 604, the method performs a recovery of the language data.

For this purpose, the Bip SOS contains a basic native language library which has been specially designed for it, and updated via machine learning. So, each time the user changes his country, this library updates automatically as soon as the user connects to the Internet.

In a step 605, the method performs an operation of calling emergency services by means of a text-to-speech function. Indeed, with all of its elements provided, the SOS beep can construct a robotic message during the telephone call to emergency services (firefighters, police or other) depending on the situation and the language of the country of call thanks to the native class of Android or iOS called TextToSpeech. In general, the implementation of speech synthesis from a text message is well known to a person skilled in the art and, for the sake of brevity, will therefore not be described further. It suffices to point out that, in the specific application envisaged here, multilingual speech synthesis is carried out taking into account the linguistic context provided by the GPS data. Thanks to this particularly advantageous arrangement, a foreign tourist visiting Paris will be able to have their mobile phone call the emergency services of the French city, and thus directly in the French language.

The robotic voice message is expressed according to user information, the details of which are as follows:

User information: step 602

User information is already stored in the application through the native class of Android or iOS which is named SharedPreferences.

GPS location: step 603

The user's GPS location is provided natively by the GPS chip integrated into the smartphone. This makes it possible to locate the user in relation to the country of residence from which he registered the application and thus, to know if he is traveling outside his country—therefore initial registration of residence.

The user's position can also be known, if applicable, via the roaming system provided by his telephone provider, based on the changing country code.

Language library: step 604

The application contains a basic native language library that has been specially designed for it; this library is updated using the "machine learning" process. Consequently, each time the user changes his country, this library is updated automatically as soon as the user is connected to the Internet.

So with all its elements provided and collected, the application can build a robotic message during the phone call to emergencies (firefighters, police or other) depending on the situation and according to the language of the country of call thanks to the class native to Android or iOS called TextToSpeech.

2. Non-Network Zone:

The method of retrieving information is the same as in a network environment, except that for sending the alarm, the data is packaged and sent to the satellite, after the satellite communication established according to the process demonstrated above, the data is transmitted in the Active Assistance server and this is the server which translates the message into a system equivalent to TextToSpeech.

The off-grid alert sending system has already been explained above.

Figure 7:
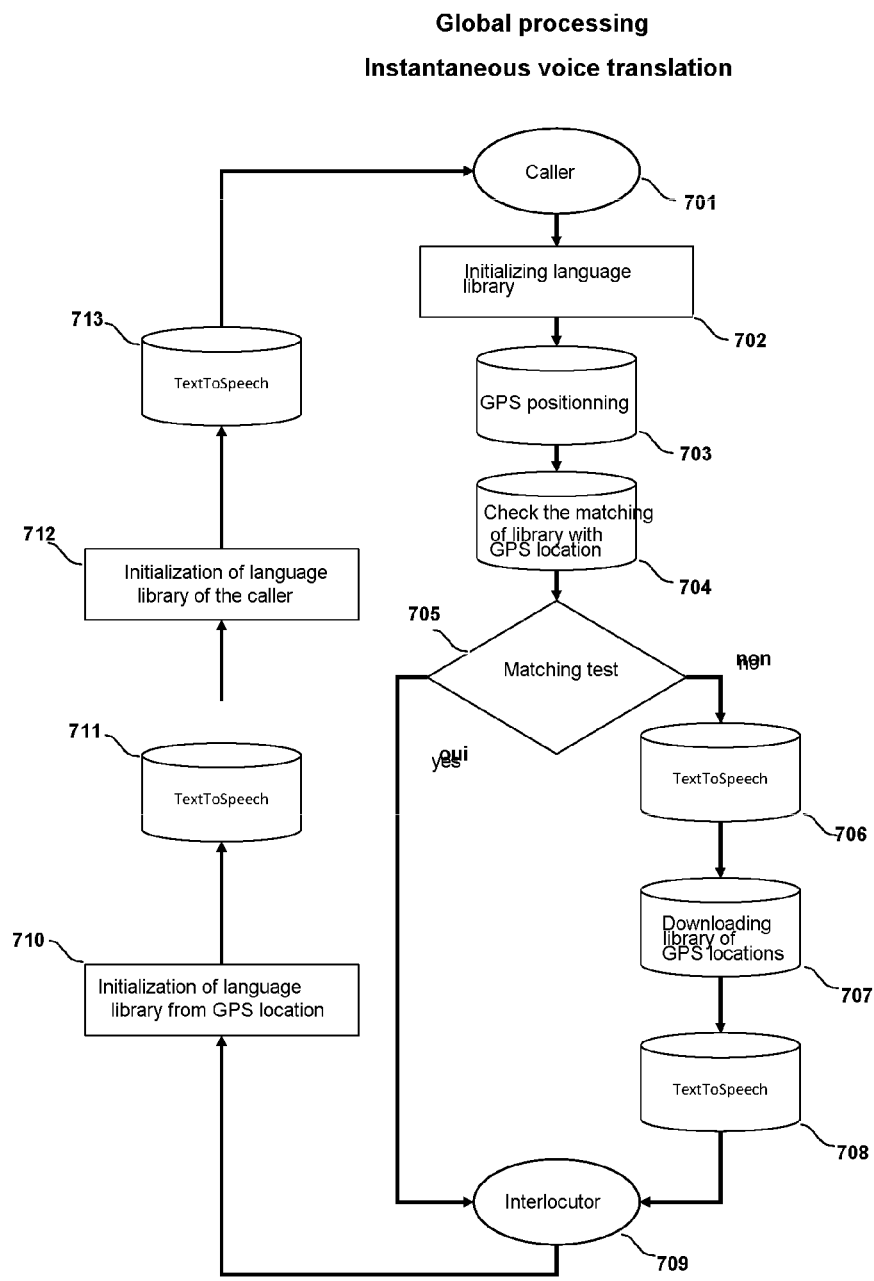
FIG. 7 illustrates a particular embodiment of an overall instantaneous voice translation process.

Next, another particular embodiment aimed at setting up simultaneous voice translation, as illustrated in steps 701-713 of FIG. 7, is described.

The simultaneous voice translation system, unlike google translation for example, is always played by the system previously designated TextToSpeech, coupled with optimal translation time, that is to say without latency.

The process begins in a step 701 when the telephone communication is established between the user (Caller) and the called emergency service (Correspondent):

In a step 702: the method carries out an initialization of the language library preinstalled in the application.

Then, in a step 703: the method performs a GPS positioning. To this end, the application uses the GPS sensor to store the user's GPS location in relation to the country of residence from which he recorded the SOS Bip and thus to know if he is traveling outside his country of residence or not.

In a step 704, the method checks the matching between the library used and the GPS location. In a step 705, the method performs a correspondence test: If this correspondence confirms the exact correspondence between the library used and the GPS location, confirming that the user and his interlocutor will correspond in the same language, then the method continues with a step 709 which allows the establishment of the telephone call.

If the test of step 705 shows that the correspondence between the library used and the GPS location has not been established, then the method continues with a step 706 for the purpose of performing a first speech synthesis operation. For this purpose, the application uses the TextToSpeech class which translates the caller's speech and produces a text in the caller's language.

In a step 707, the method performs a download of the GPS location library. If the language of the speaker does not exist in the language library, then the application downloads and initializes the language library corresponding to the detected GPS location.

Then in a step 708: the method implements a second speech synthesis operation. To this end, the application uses the TextToSpeech class to translate the text created above and generate a robotic voice message in the language of the speaker.

Then the method continues with step 709, allowing the caller to listen to the robotic voice message and respond in his/her language.

In a step 710, the method continues with an initialization, by means of the application, of the language library resulting from the GPS location, i.e. the language of the interlocutor.

In a step 711, the method implements a third text-to-speech operation by means of the application which calls the TextToSpeech class to produce a text message in the language of the interlocutor.

The method then continues with a step 712 during which the application initializes the language library of the caller.

Finally, a step 713, the method implements a fourth text-to-speech operation by means of the TextToSpeech class to translate and generate a robotic voice message using the caller's language.

Then the method returns to step 701 in which the caller listens to the robotic voice message.

As can be seen in FIG. 7, the dialogue can thus continue by resuming the routine described above (701 to 713) for the time necessary for the proper transmission of information until the end of the communication.

We now describe some details about the language library:

The language library module, which has been designed especially for the application, looks like this:

It is a database of languages.

Natively, it automatically saves all the languages available in the user's smartphone when installing the application, So this is the base library.

But when moving to a place or a country whose language has not yet been translated, if the smartphone has internet access, the library will be enriched thanks to the machine learning system, by virtually browsing the websites registered in the country domain, but also by downloading the language of the country where the smartphone is located using a suitable module, for example google languages.

Figure 8:
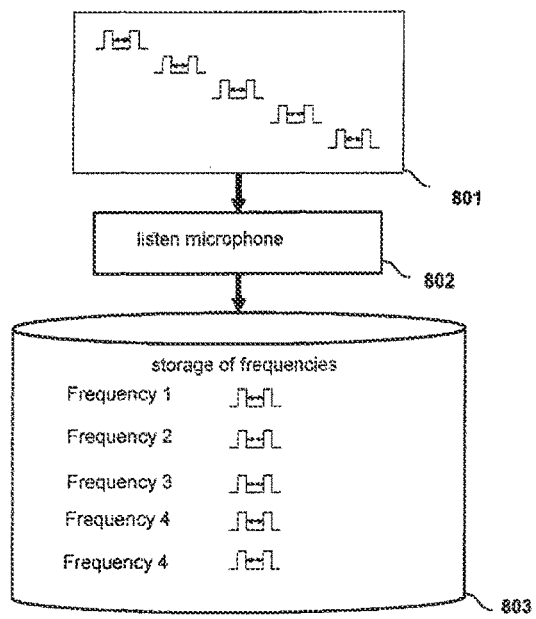
FIG. 8 illustrates another embodiment of a control method for triggering an alert.
Figure 8:
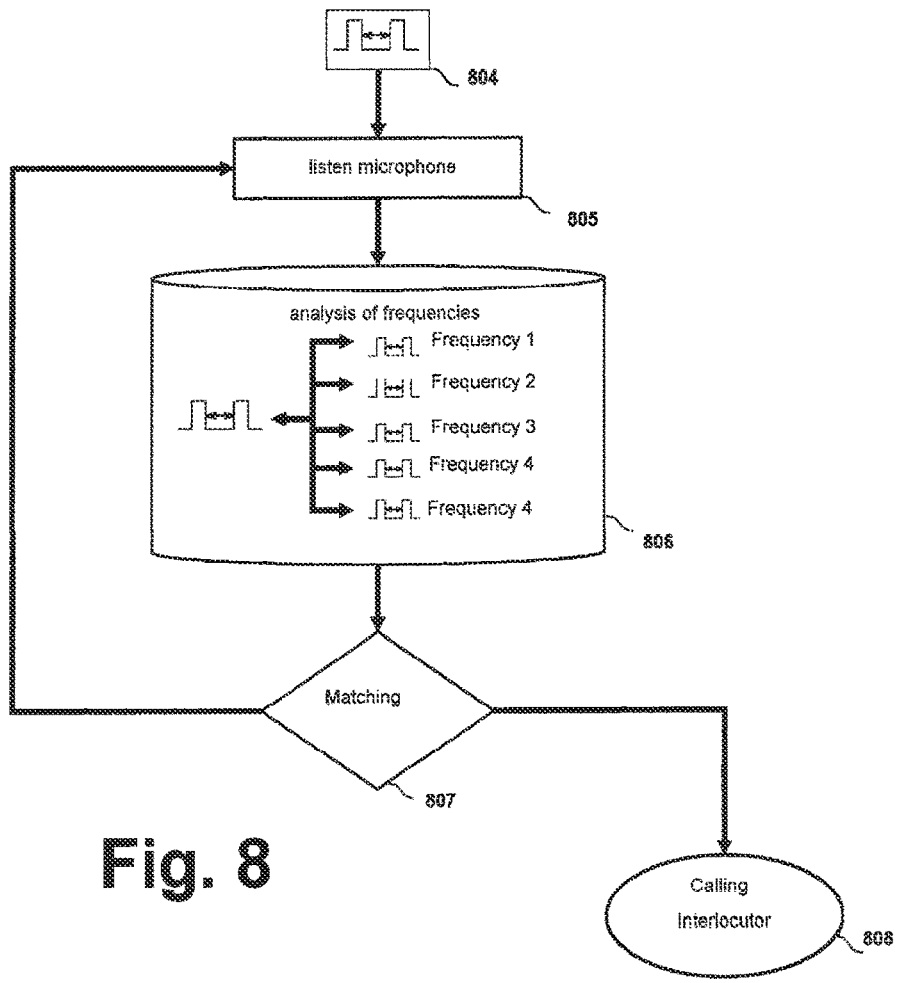

We will now describe, in relation to FIG. 8, another particular embodiment of voice control for triggering an alarm.

The method starts with an initialization step 801, during which the user is invited to record a determined number of sentences, at least 3, necessarily containing the defined keyword "Help" such as, for example "Help, I have severe pains in my chest", "Help, someone attacked me", "Help, I fell" etc. in order to identify the sound frequencies characterizing these expressions spoken in different tones and circumstances: whisper, normal voice, screaming voice, frightened voice, etc. and leading to the voice identification of the user, or even the definition of his voice print by the frequency recorded.

In a step 802, the method activates the microphone which can thus listen to and receive the voice messages recorded by the user.

Then, in a step 803, the native recording class stores these sounds in the application in the form of frequencies: frequency 1, frequency 2, frequency 3, etc. This completes the preliminary initialization procedure based on steps 801-803.

Then the method continues with a step 803 during which the voice control method becomes properly operational and the microphone is then activated, in a step 805, in order to allow contextual listening of the ambient medium. In an emergency use, according to the concept of the application which is to detect in various and differentiated modes and in the environmental conditions collected by the smart phone, the user pronounces the defined word as a voice command to trigger a alarm, for example "Help", the frequencies of which are recorded by the microphone activated or reactivated and stored in the application.

In a step 806, the method correlates the sound signal captured by the microphone in order to try to obtain a correlation between this sound signal and one of the backup vocal expressions previously recorded in the steps 801-803. To this end, the application compares the frequency of the recorded word to trigger an alarm with three to five prerecorded expressions.

NOTE: the frequencies are defined as follows: in the form $f=1/T$ where f is the frequency in Hertz (Hz or s−1) and T the period in second (s).

In the application, the prerecorded frequencies have a tolerated variability of (+) or (−) 10%. The range thus obtained for each pre-recorded frequency is intended, by comparison with the recorded word, to establish the correspondence with the recorded word while taking into account the influence of external conditions on the user's voice such as fatigue, illness, speed or strength of expression.

In a step 807, the method performs a correspondence test. If the analysis does not match, the method returns to step 805 and the application resumes analysis of the spoken voice command or, alternatively, resumes the entire process at step 803 if the user repeats voice control again.

If the test of step 807 results in establishing a matching, then the method continues with a step 808 during which the application triggers the alarm, that is to say the telephone call and an SMS to the interlocutor.

Figure 9:
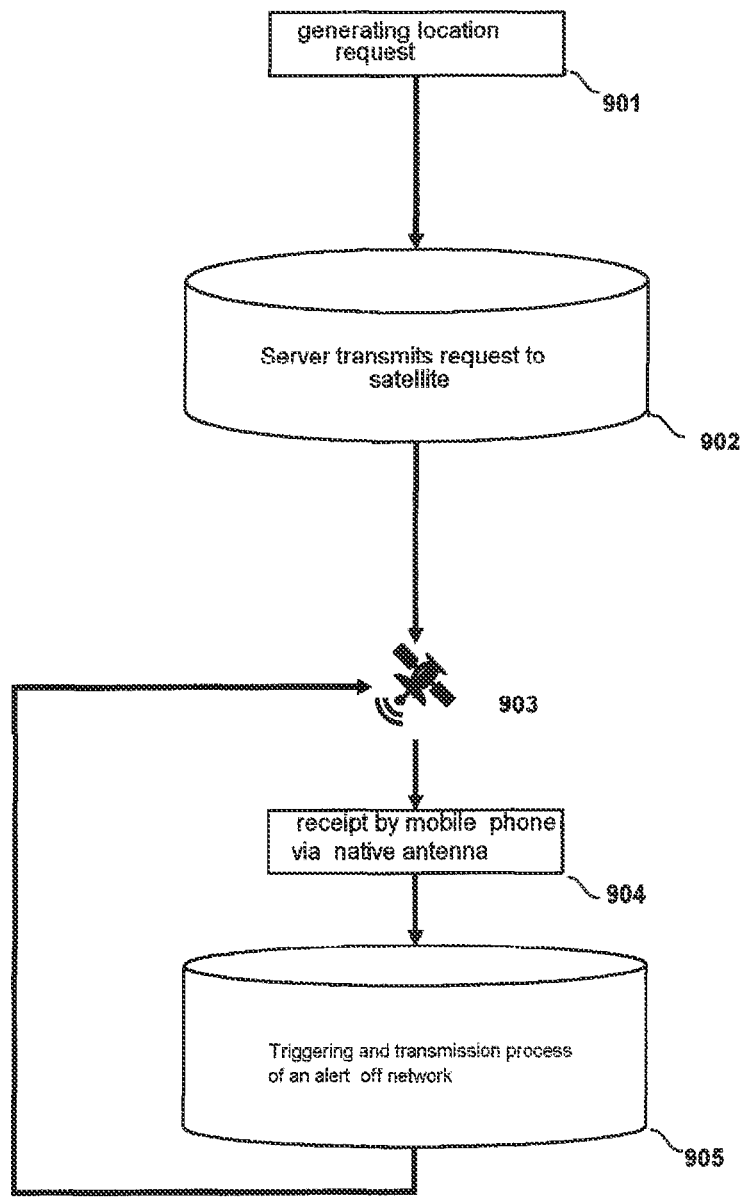
FIG. 9 illustrates an example of a method of GPS tracking in an off-grid situation.

NOTE: the process defined above has the following major advantages:

Identification of the user by his voice and, consequently, certification of the alarm Light and fast process by collecting and translating voice commands by capturing and analyzing sound frequencies and not by processing language libraries Very low need for resources thus allowing very low battery consumption A description will now be given, in relation to FIG. 9, of a particular embodiment aimed at setting up a communication between a server responsible for managing the physical and individual security of a user and a mobile telephone of the latter, and this in a somewhat extreme situation which is that in which said mobile telephone is not covered by any GSM network. In such a particularly critical situation, the method of the invention aims to query the GPS geolocation of said mobile telephone and therefore of its user, as will be seen more particularly with steps 901-905 illustrated in FIG. 9.

The method starts with a step 901 during which the server generates a request to request the GPS location of the mobile phone of the user supported by the individual physical security service. To this end, the server prepares an instruction, generally based on an information packet, preferably encoded in assembly code aimed at extracting the GPS geolocation of the smart phone located in an off-grid area and identified by its IMEI.

The method then continues with a step 902 during which the server transmits the request generated to the satellite and this by using a frequency suitable for synchronizing with the frequency used by said satellite.

In a step 903: the method proceeds with the reception, by said satellite, of the request generated by the server, and comprising the information packet including the IMEI number of the mobile telephone.

The satellite then proceeds to transmit a request to the mobile phone.

In a step 904: the information packet is received by the native antenna of the smartphone.

In a step 905: the process defined above concerning the sending of an off-network alarm is resumed.

The class takes control of the physical antenna of the application in order to implement a process consisting of:
  change the frequency to adapt it to the frequency required by the satellite
  synchronize with the frequency used by Immarsat to send an SMS to the remote telephone In practice, in a particular embodiment, this takeover is carried out by executing an assembly code. Indeed, this then makes it possible to lower the level of the language towards a machine language, in order to better manage and lighten the package of information processed and to ensure the change of frequency.

What is claimed is:

1. A method of generating a voice or click alert and an electronic message from a smartphone comprising a display and various sensors including a Global Positioning System (GPS) sensor, the method comprising the steps of:
  downloading in said smartphone a remote assistance application including the setting up a microphone control service, irrespective of whether said smartphone is locked or unlocked;
  activating the sensors present in said smartphone to collect information and data related to the smartphone environment irrespective of whether said smartphone is locked or unlocked;
  carry out a contextual analysis of the information collected by the sensors to determine an emergency situation requiring the triggering of an alert, irrespective of whether said smartphone is locked or unlocked, wherein the contextual analysis step comprises the step of:
 selecting an intermittent tracking or tracking to destination mode, wherein:
  said intermittent tracking mode consists of carrying out, at regular intervals, comparisons of successive geolocation data to determine one or more unchanging geolocations and, following the determination of unchanging geolocations, to launch an alert processing procedure;
  said tracking-to-destination mode comprises defining, by a user, a destination, a tolerable delay (RT), and a tolerable deviation (ET) to the destination, and real-time calculation of a delay effective (RE), and effective deviation (EE), and their respective comparison with the tolerable delay (RT) and the tolerable deviation (ET) to trigger an alert processing procedure; and
   the values of the tolerable delay (RT) and the tolerable deviation (ET) are determined in profiles previously stored in the mobile telephone.

2. The method according to claim 1, wherein said contextual analysis comprises the following steps:
 the detection of a "double click" on a button on the display and/or a specific area of said display;
 the detection of a "long press" on a specific area of said display;
 the detection of a "long press" on the Volume key of said smartphone;
 the detection of a predefined combination of long presses and short presses;
 a voice alert detection captured by the microphone; and
 a contextual analysis of the information generated by the sensors present in said mobile telephone.

3. The method according to claim 1 wherein said microphone control service periodically initializes the microphone so as to ensure, in all circumstances, control of the audio channel; and wherein said application is configured to capture audio messages of a predefined maximum length, and to compare these messages with a library of predefined audio messages.

4. The method according to claim 1, wherein said microphone control service proceeds opportunistically, by permanently controlling the microphone and the audio resources in low-level machine language, by setting the microphone and the audio resources on standby and by reactivating the same; and in that the remote assistance application is configured to sense sound frequencies pre-recorded by the user for ensuring voice identification of the user.

5. The method according to claim 1 characterized in that the processing of the alert comprises the steps of:
 optionally invite the user to confirm the triggered alert;
 performing a call from a close contact defined in a list of N close contacts;
 in the event of a successful call from a close contact, opening a communication session and transmitting a Short Message Service (SMS) including the geolocation data of the mobile telephone; and
 in the event of failure of the attempt to call close contacts, starting a call procedure to a remote assistance center, said remote assistance call procedure comprising the steps of:
  activating the audio microphone;
  activating the loudspeaker;
  securing storage of sensor data; and
  transmitting SMS & sensor data.

6. The method of claim 1 wherein the smartphone is combined with an amplifier and a satellite antenna, enabling satellite voice and data communication for processing the alert.

7. The method according to claim 6 wherein the application downloaded to the mobile telephone performs satellite communication by:
 calling a class after a network testing, wherein the class is called to process the sending of data using satellite for controlling a native antenna of the mobile telephone for the purpose of:
  changing frequency of the native antenna, and synchronize with the frequency used by the satellite to send a Short Message Service (SMS) to a second mobile telephone, wherein, upon changing of the frequency, the mobile telephone calls on a second class to send the SMS directly to the second mobile telephone.

8. The method of claim 6 wherein the smartphone is configured to: send and receive a Short Message Service (SMS) via satellite communication with another identified smartphone, and capture a fingerprint, voice, or face prior to the communication.

9. The method of claim 1 wherein the smartphone is configured to allow communication via a satellite protocol using a native antenna of the smartphone, to establish satellite communication between two smartphones in which an International Mobile Equipment Identity (IMEI) number of the two smartphones are used for identification of recipient and sender.

10. The method according to claim 1, in which the detection of a "long press" is carried out directly on the Volume key of an independent telephone.

11. The method according to claim 1, in which the application enables a user to be understood by an interlocutor regardless of his language, using a robotic voice message.

12. A method according to claim 1 wherein the application enables a user to be able to speak and be understood by an interlocutor regardless of their language, through an instant voice translation process.

13. A method according to claim 1 wherein the application recognizes the voice of the user and thus enables the unambiguous identification of the user.

14. The method according to claim 1, wherein the application receives a request for GPS geolocation from an external server, and sends the response back even through a second network.

15. A mobile data processing device, allowing wireless communication within a Global System for Mobile communication (GSM) type cellular network, said device comprising:
 a memory for storing data and programs;
 a processor allowing the execution of applications and the processing of data;
 a display;
 a camera;
 a loudspeaker associated with its amplifier circuit;
 a power supply;
 a block comprising various interfaces, in particular a network interface allowing wireless communication with various networks;
 a block comprising multiple sensors making it possible to generate multiple information and signals representative of the environment of a user in which the telephone is configured to download an application for the implementation of the method of claim 1.

\* \* \* \* \*